Dec. 19, 1967 J. H. LANCOR, JR 3,359,058
INFORMATION DISPLAY SYSTEM
Filed Jan. 29, 1965 3 Sheets-Sheet 1
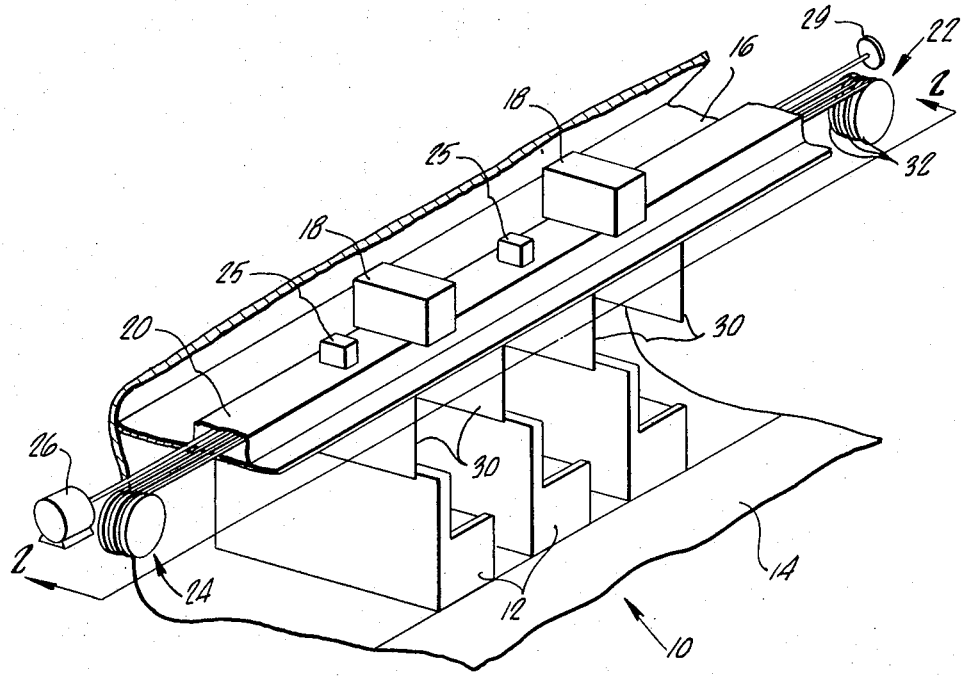
FIG_1
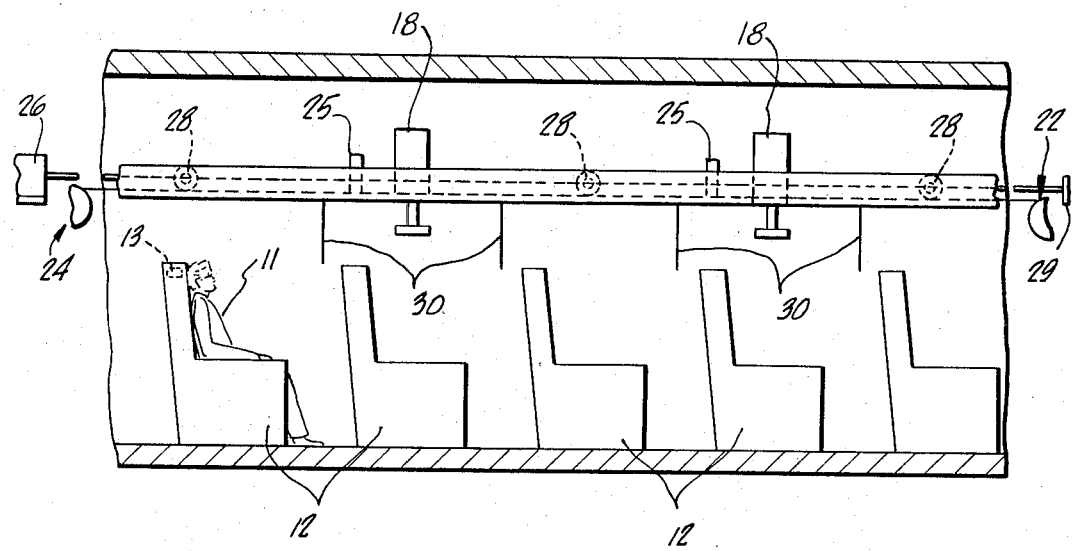
FIG_2
INVENTOR.
JOSEPH H. LANCOR, JR.
BY
Christie, Parker & Hale
ATTORNEYS.

Dec. 19, 1967 J. H. LANCOR, JR 3,359,058
INFORMATION DISPLAY SYSTEM

Filed Jan. 29, 1965

INVENTOR.
JOSEPH H. LANCOR, JR.
BY
Christie, Parker & Hale
ATTORNEYS.

Dec. 19, 1967      J. H. LANCOR. JR      3,359,058

INFORMATION DISPLAY SYSTEM

Filed Jan. 29, 1965      3 Sheets-Sheet 3

INVENTOR.
JOSEPH H. LANCOR, Jr.
BY
Christie, Parker & Hale
ATTORNEYS

United States Patent Office 3,359,058
Patented Dec. 19, 1967

3,359,058
INFORMATION DISPLAY SYSTEM
Joseph H. Lancor, Jr., Arcadia, Calif., assignor to Consolidated Electrodynamics Corporation, Pasadena, Calif., a corporation of California
Filed Jan. 29, 1965, Ser. No. 429,091
2 Claims. (Cl. 352—6)

ABSTRACT OF THE DISCLOSURE

A system for presenting a selection of motion picture presentations to an audience group. The presentations are guided through the projector which is adjustable such that its projection axis is alignable with a selected one of the plurality of presentations. A magnetic tape cowound with the presentation provides the sound track accompaniment for the film.

---

Figure 3:
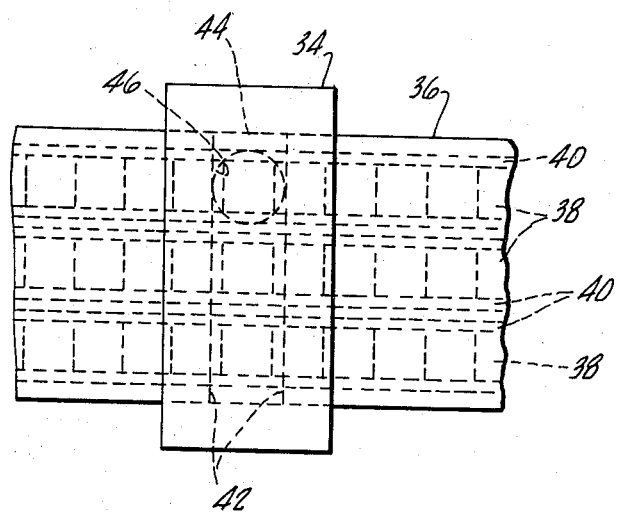

This invention relates to information display systems and, in particular, to a film system for providing a selection of audio-visual subject matter at a plurality of individual projection stations spaced throughout areas such as the passenger cabins of common carriers, classrooms, and the like.

Among recent developments in air travel has been the introduction of systems for entertaining passengers while in flight. At the present time, the entertainment systems that are being used are basically of two types: the first being a conventional motion picture projection system and the second, a television system using a centralized video tape reproduction unit and a number of auxiliary television sets operating off of the reproduction unit.

It has become evident that the two systems as presently conceived have certain inadequacies. In the motion picture projection type of system, a familiar approach is to use two sets of projectors and screens, one located at the rear of the cabin and the other approximately amidships. This normally corresponds to the division of the cabin into the first-class and tourist sections.

Since the projector is located at a substantial distance from the screen and the projection screen is relatively large, the light intensity on the screen is insufficient for comfortable viewing under normal cabin lighting and the entire airplane cabin must be darkened as in conventional movie theaters. This means that all of the passengers on the plane are, in effect, a "captive" audience. Those passengers who might prefer to read or work rather than view the film because they have already seen it or are simply disinterested are discouraged by the circumstances from doing so. In addition, such a system is capable of providing only one presentation at a time. This means that passengers who are desirous of being provided with entertainment are deprived of any possibility of having a selection of subject matter because of the complete lack of individual or group control.

Video tape systems as presently constituted represent a possible alternative to the motion picture projection approach. In the typical tape system, a number of receivers are located throughout the passenger cabin. In one arrangement, one receiver is provided for every two seats in the first-class section and one for every six seats in the tourist section. One feature of such a system is that the number of receivers can be increased to the point where a receiver is provided for each passenger in the aircraft. However, even the arrangement just described has an excessive cost and it is precisely the cost of a video tape system that is its more serious drawback.

In addition to the cost, it has also been found that airborne video tape systems are subject to a substantial amount of interference, both natural and that produced by the electronic equipment on board the airplane. Furthermore, experience with such systems has proven that they are susceptible to malfunctioning and it is the exception rather than the rule for an intercontinental flight to be completed without one or more sets, or perhaps the entire system, suffering an interruption of some length.

The present invention avoids the inadequacies above by providing a novel information display system. This system comprises a plurality of film projection stations and at least one motion picture film carried serially through the several projectors. A supply and take-up roll for the film are provided with the plurality of film projection stations being disposed at spaced intervals between the rolls. The system is completed with the provision of drive means for propelling the film from the supply to the take-up and guide means interconnecting the projection stations and the rolls for directing the film through the system.

In a preferred embodiment, two or more films are carried in parallel serially through the several projectors and each projector includes means whereby the viewer may select which one of the several films to project at any given time.

The invention further contemplates a method for displaying information recorded on motion picture film at a plurality of stations. The method comprises the steps of providing the film at a supply position and threading the film from the supply serially through each of a plurality of display stations to a take-up position. Thereafter, the film is driven from the supply to the take-up position and the plurality of stations are selectively energized to provide a display of the information recorded on the film as it passes through the energized stations. After being withdrawn from the supply position, the film is guided to the individual stations in a predetermined sequence and to the take-up position after it has passed the last station.

In contrast with the conventional movie projection and video systems, the present system has sufficient brightness in its display apparatus to be observed in comfort under normal lighting conditions and has the capability of being individualized to eliminate the "captive audience" aspect of the prior art film system. Moreover, in the embodiment providing two or more films, a selection of subject matter is available to the viewers, thereby allowing the passengers to select the subject which most closely corresponds to their individual interests. Finally, the present system is capable of providing presentation in color at a reasonable cost.

Figure 4:
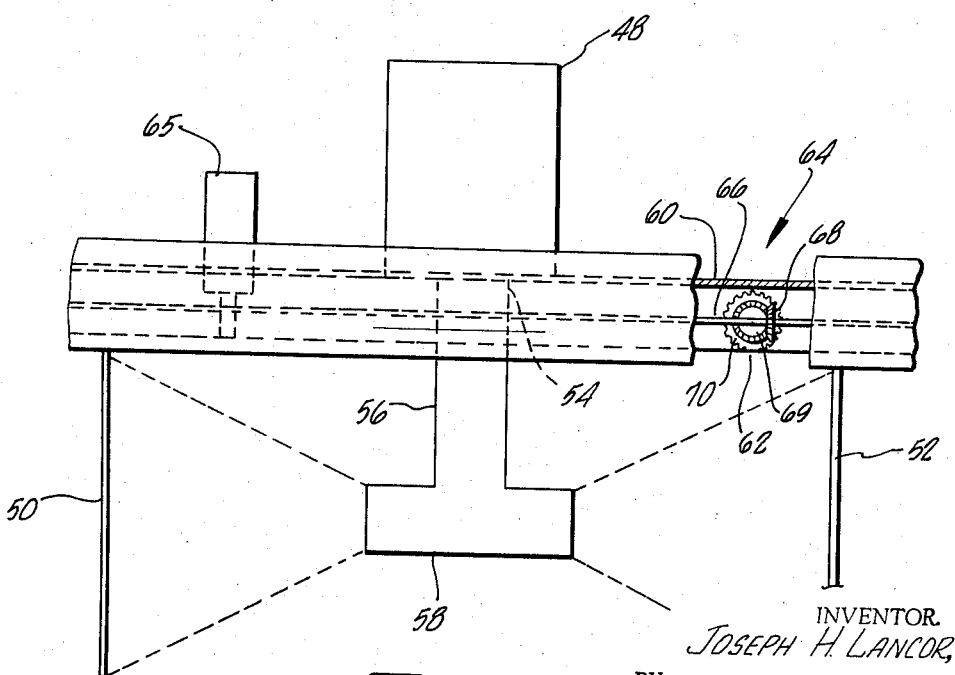
Figure 5:
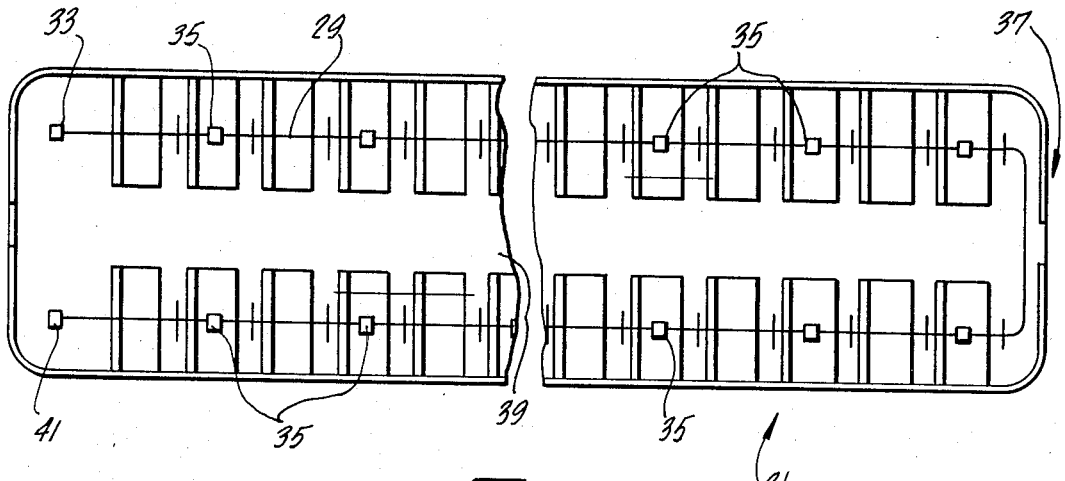
Figure 6:
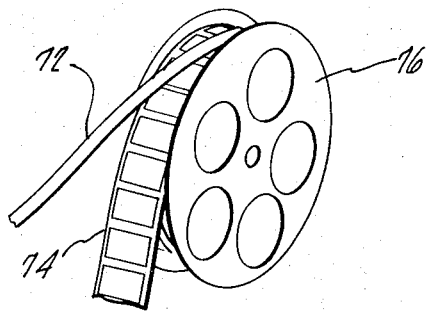
Figure 7:
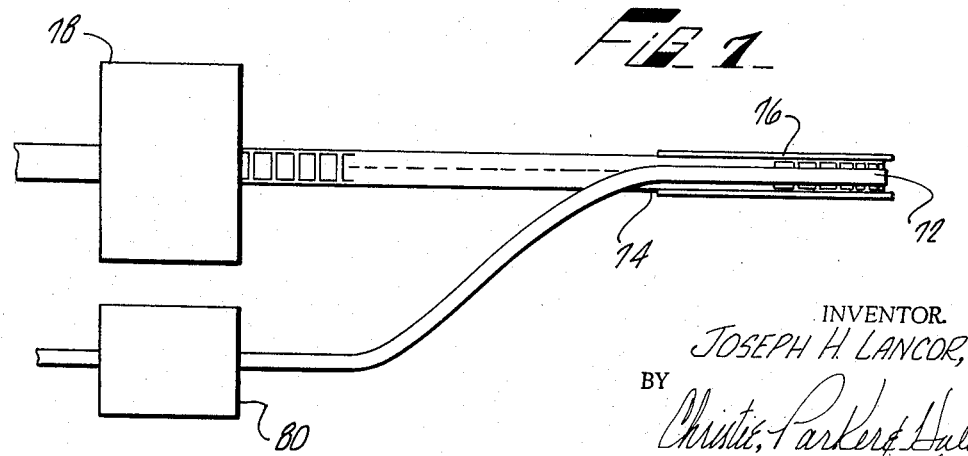

These and other features of the invention will become more apparent by reference to the following figures, in which:

FIG. 1 is a perspective view of a typical common carrier cabin showing a telescoped embodiment of the system of this invention, FIG. 2 is a section view taken along lines 2—2 of FIG. 1 showing the detailed relationship of projectors, screens, and passenger seats, FIG. 3 is a plan view of one embodiment of the invention illustrating the relationship of a projector and the duct in which multiple films are carried from supply to take-up reels, FIG. 4 is a detailed view showing the relationship of the projector, screen, sound head, and drive means at a particular station in one embodiment of the system, FIG. 5 is a schematic diagram of one embodiment of the invention in which one of each of the selection of films connects all projection stations in the system, FIG. 6 is a perspective view of a reel of motion picture film co-wound on the reel with a length of magnetic tape, and FIG. 7 is a schematic diagram of the audio and visual reproduction units for use with the reel of FIG. 6.

Referring now to FIGS. 1 and 2, there is shown a cabin 10 of a typical common carrier wherein a number of seats 12 are provided along an aisle 14 beneath an overhead shelf 16 normally used for carrying luggage and the like. Provided on the shelf are a plurality of motion picture projectors 18 located transversely of a duct 20 connecting a supply roll 22 and a take-up roll 24. A drive motor 26 is located adjacent take-up roll 24. The motor 26 is connected to a flexible shaft extending into and through duct 20 to a termination 29 adjacent the supply roll 22. A number of power take-off points 28 are located in the duct at staggered intervals along the shaft between the supply and take-up position which aid in transporting the film from the supply rolls through the projection stations to the take-up rolls. Screens 30 suspended from the overhead shelf are disposed before each of the seats 12 for receiving the information projected by the system as the film is transported through each projector.

In contrast with video tape systems wherein the information is transmitted electrically to each of the display stations, the present invention uses the film itself as the transmission medium. Here the audio-visual information is delivered to each desired location by the continuous physical transfer of film to individual projectors where the images recorded on the film are picked up and projected to screens associated with the projector.

While the system has been depicted as being located on an overhead shelf above a passenger seating area, such an embodiment illustrates only one of a number of possible ways in which such a system could be designed. In the embodiment shown, another system running parallel to that depicted in FIG. 1 is provided for passenger seating area located on the opposite side of aisle 14.

Three reels 32 comprise the supply roll 22 depicted in FIG. 1. Depending on space limitations and drive means available, the system of this invention is capable of providing a plurality of separate film subjects simultaneously; the three reels shown being representative of such a plurality. The viewer or viewers seated in proximity with a particular station then select which of the plurality they wish to view and operate means for adjusting the projector associated with their particular station to pick up the selection desired.

Among other advantages of this selectivity and individual control is that certain potentially embarrassing situations can be prevented. For example, such a situation might arise where children are traveling on the airplane and their parents wish to prevent them from viewing a particular production. Since some presentations tend to take on an "adult" flavor, some parents might wish to avoid them and still provide some form of entertainment for the children. With the system of this invention, they are now capable of doing so.

In the system as depicted in FIGS. 1 and 2, one projector 18 is provided for every two projection screens 30. This is accomplished by means of techniques such as split projection and front and back lighting of screens. In the system as contemplated in this embodiment, one screen is provided for each row of passengers 12. In typical common carrier enclosures there are two or three seats abreast in each row. Where economic and space considerations permit, the number of individual projectors and screens can be proliferated to the point where each individual passenger is provided with his own projector and screen.

Sound heads 25 are located adjacent each projector for detecting and transmitting the audio portion of the presentation to those receivers associated with that projector. The sound head is an optical or magnetic detector, depending on the type of recording provided with the film. Sound is provided on an individualized basis by transmitting the sound track from the sound head to each individual passenger 11. A magnetic speaker 13, located in the passenger headrest, is provided for broadcasting on a localized basis to the passenger in that seat. Conventional headsets can also be provided to convey the audio portion to the viewer.

In other embodiments, the film track can be located in the center of a passenger enclosure above the aisle which normally runs through the middle of the enclosure. Where such a variation is employed, the projectors would then be required to project on a slant if it is desired to provide read-out directly above the seating locations. Still another embodiment is one in which the system is located under the floor of the enclosure and is provided with a suitable optical system for projecting it from there to screens disposed as in FIGS. 1 and 2.

A preferred variation of the embodiment shown in FIGS. 1 and 2 is illustrated in FIG. 5. In this variation, the film track 29 is looped around the enclosure 31 in which the showing is to be made. From supply reels 33 the film passes through projection stations 35 to the end 37 of the enclosure opposite the supply reels. By suitable guide means the film is directed across the aisle 39 of the enclosure and turned toward the take-up reels 41 which are located adjacent the supply reels on the side of the aisle opposite them. After passing through another series of projection stations 35, the film is gathered on the take-up reels. The advantage of such a variation is that only a single copy of each film presentation is required to traverse the entire area in which the information is to be displayed.

In FIG. 3, the detailed relationship of a projector 34 and the duct 36 in which one or more films 38 are located is shown. As contemplated by this invention, the supply reels discharge their film into an enclosed duct 36 provided with a number of individual tracks or guides 40 through which each individual film travels. The advantage of providing an enclosed duct is that by this means the film is protected throughout its transit from supply to take-up, is kept clean, and is prevented from becoming snarled with films in adjacent tracks. A projector 34 is located transversely of the duct 36. The duct is provided with a pair of tracks 42 defining a transverse opening 44 in the top of the duct. By means of the tracks, the projector lens 46 can be moved transversely of the duct and located over one of the individual film guides 40 corresponding to the particular subject matter selected.

An individual projection station is depicted in FIG. 4 showing in greater detail the means whereby one projector 48 can be utilized to produce images on two screens 50 and 52. After the projection lens 54 is located adjacent the film selected, the projector is energized and as the information recorded on the film is transported past the lens, it is projected down and split by optical system 56 so that identical images are projected forward to screen 52 and rearward to screen 50. Simultaneous front and back lighting of projection screens is well known in the motion picture arts. As depicted in FIG. 4, the projector 48 is situated directly on top of a duct 60 which serves to enclose the film track 62. Adjacent the projector, an auxiliary drive point 64 for transporting film along a path from supply to take-up is schematically shown. As indicated, a flexible shaft 66 passing through the duct parallel to the film guides drives a sprocket wheel 70 by means of right-angle gears 68 and 69. The sprockets of wheel 70 engage the film and serve to drive it along the track in which it is located. A sound head 65 is associated with projector 48.

As indicated, the film travels in a substantially unidirectional manner from supply to take-up. In conventional projection systems, a "pull-down" type projector is used with the attendant necessity of looping and threading the film through the projector in order for the system to be operable. However, a second type of projector known as the "rotating prism" type of projector, such as is used by film editors, is preferred in this system. In such a projector, the film can be moved substantially directly through the projector without the need of looping and threading, and a rotating prism through which light is projected is the means whereby individual frames on the film are picked up and flashed on a projection screen. Elimination of the looping and threading of "pull-down" projectors reduces the possibility of fouling of the film and simplifies the drive mechanics.

As contemplated, the screens on which the information is to be projected are relatively small. This means that the projection lamp in each of the propjectors can be of relatively low power and yet still generate sufficient intensity to project an image with sufficient brightness to be viewed even when the passenger enclosure is provided with normal lighting.

In operation, the various film reels are mounted at the supply position and the leader on each film is extended therefrom into the duct. Loading of the film through the system can be accomplished in a variety of ways including manual loading. Since the preferred embodiment of the system includes an enclosed duct in which the film is located as it travels through the system, the system lends itself readily to the use of air pressure within the duct to cause the film to be passed therethrough and thence to the take-up position. An alternate means of loading would be to exhaust the duct and to employ the partial vacuum generated therein to load the film.

Once the film is loaded through the system, controls are provided at the various screen locations whereby the passengers selectively energize and adjust the projectors to select the particular subject matter to be viewed and connect their speakers or headsets to the sound reproduction equipment in the system. The system is operated and film transported through the individual projection stations.

The system has been described with particular reference to common carriers such as railroads, busses, and airplanes because it is in these locations that the system finds most immediate application. However, it is contemplated that due to the substantial economies together with advantages attendant on such an individualized system, that it can also be of great utility in such situations as classrooms and the like.

Preferably, the projectors and film used in a system of this type are of the 16-mm. variety to take advantage of the substantial volume of material that is recorded and available on 16-mm. film. This preferred arrangement also has the added advantage that it is compatible with certain motion picture projection systems currently in use in airline travel and hence all new film releases will be available for use with that system.

In addition to providing multiple presentations by means of individual films, it is also possible to record two or more different film productions on one film strip. For example, it is now well known in the art to use a technique of split printing to print two 8-mm. films on one 16-mm. film strip. The sound track for the two films is then recorded on a magnetic sound track which is provided in the middle of the film strip between the two 8-mm. recordings.

Still another way in which the audio portion of the presentation can be provided with this or any film system is to co-wind a magnetic tape 72 and a film 74 on the same reel 76 (FIGS. 6 and 7), with the magnetic tape interleaved between the layers of film. The composite package is then mounted as would be the case when a reel containing film alone is used and the two strands are withdrawn simultaneously from the reel. At a point prior to the reproduction portion of the system, the strands are separated with the film 74 passing through a film projector 78 and the sound or magnetic tape 72 being directed through magnetic tape reproduction means 80. Such a system retains synchronism between the film and the sound within one frame or less.

The advantage of a system of co-wound film and tape is that a plurality of sound channels can be provided on the tape, the total number being determined by the size of the tape. Typically, up to sixteen channels can be recorded on a one-half inch tape. This introduces into the system the capability of providing simultaneous recordings in different languages of the audio portion of the film presentation. Thus, on international air flights, it is possible to provide a sound track of a particular film presentation in three or more different languages as, for example, English, French, and German, with each passenger having the opportunity to select the recording in his native tongue. Presuming that sixteen sound channels are available on the tape, even the provision of six different languages means that ten channels of sound are still available to be devoted to other uses. Such other uses would be to record several channels of stereophonic music, e.g., two channels of classical music and two channels of jazz music. On the remaining channels, nursery rhymes or narrative stories for children might be recorded. The preceding is simply an illustration of the flexibility that would be possible with such a system.

These and other variations on the basic system disclosed should be readily apparent to those skilled in the art without a departure from the spirit of the invention.

What is claimed is:

1. A system for providing a selection of motion picture film presentations comprising:
    a motion picture film projector,
    a film supply,
    a film takeup,
    means for conducting film from the supply to the takeup through the projector,
    a first plurality of motion picture presentations, each of said presentations being recorded on a film strip, said films being arranged for transport from the supply through the projector to the takeup in parallel,
    a magnetic tape having a second plurality of audio channels with recording therein, the number of channels in the second plurality being at least equal to the number of presentations in the first plurality, said tape being cowound and interleaved with one of said film strips at the supply,
    means for withdrawing the film and tape from the supply and for directing the film and tape to visual and audio reproduction means respectively,
    projection means associated with the projector selectively alignable with each one of the plurality of presentations,
    means associated with the audio reproduction means for selecting the desired channel on the tape, and
    means for presenting the selected presentation and channel at a viewing location.

2. A system for providing a plurality of sound channels to be used in conjunction with a motion picture presentation comprising:
    a motion picture film with a visually reproducible presentation recorded therein,
    a multi-channel magnetic tape, each of the channels having a different recording therein, the recording in at least one of the channels being the audio accompaniment for the film presentation, the magnetic tape and motion picture film being cowound and interleaved on a single reel,
    means for withdrawing the tape and film simultaneously from the reel and for directing the film to visual projection means and the tape to magnetic tape sound reproduction means for reproducing the visual and audio portions of the presentation,
    projection screen means for displaying the visual presentation in a presentation area,
    means for distributing the reproduced audio presentation to a plurality of individual locations in the presentation area, means located at each individual audio distribution location for selecting one of the plurality of recordings provided on the tape, and electrical-to-sound transducer means at each individual location for audibly transmitting the selected recording.

References Cited

UNITED STATES PATENTS

| | | | |
|---|---|---|---|
| 1,843,972 | 2/1932 | De Forest | 352—31 |
| 2,657,932 | 11/1953 | Blaney | 352—37 X |
| 3,262,357 | 7/1966 | Warzynski et al. | 352—123 X |

JULIA E. COINER, *Primary Examiner.*